Feb. 21, 1967  O. E. JOHNSON ETAL  3,305,025
TWO-WAY MOLDBOARD PLOW
Filed Oct. 23, 1963  3 Sheets-Sheet 3

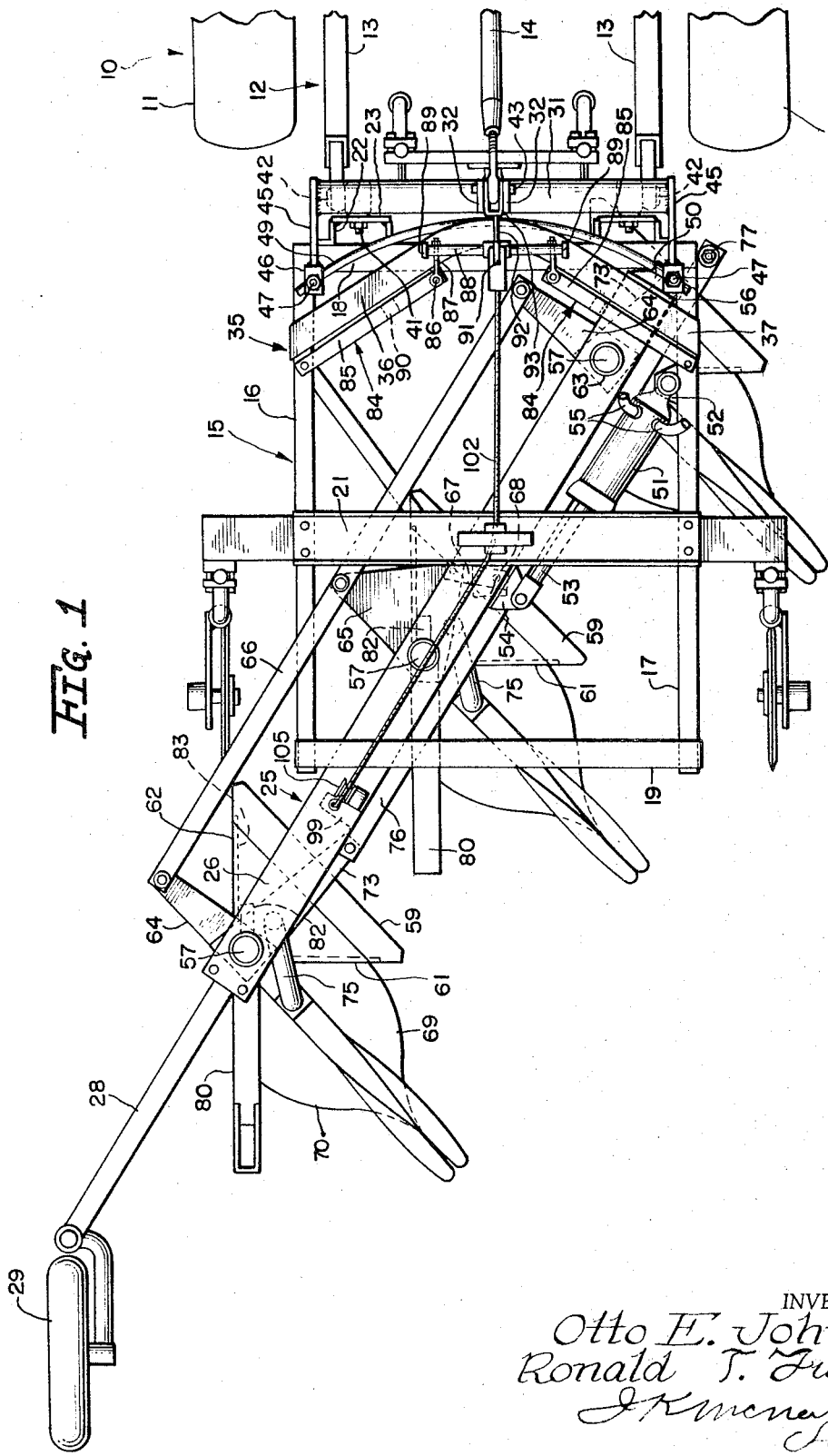

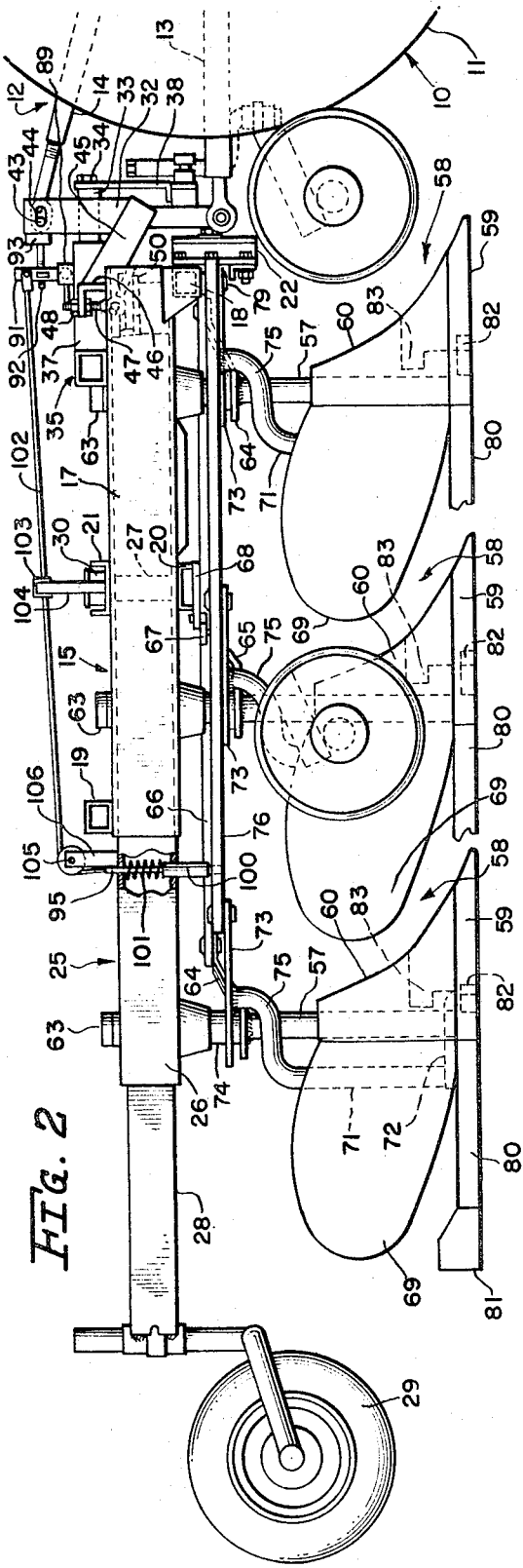

INVENTORS
Otto E. Johnson
Ronald J. Fulton
J. McNair
Atty.

United States Patent Office 3,305,025
Patented Feb. 21, 1967

3,305,025
TWO-WAY MOLDBOARD PLOW
Otto E. Johnson, Hinsdale, and Ronald T. Fulton, Tinley Park, Ill., assignors to International Harvester Company, Chicago, Ill., a corporation of Delaware
Filed Oct. 23, 1963, Ser. No. 318,279
16 Claims. (Cl. 172—218)

This invention relates to agricultural implements and particularly to reversible or two-way plows. More specifically, the invention concerns a two-way moldboard plow.

Two-way moldboard plows currently being marketed are of the type requiring at least two complete plow bottoms for each furrow to be plowed, one of the plow bottoms being a right-hand plow and the other left-handed. One popular type of two-way plow mounts right and left-hand plow units or bottoms on a horizontal axis 180° apart, one complete unit being in an inactive raised position at all times while the other is operating.

Among the disadvantages in a plow of this type is the higher cost of an implement requiring the carrying of two plow units for each furrow to be plowed. Another disadvantage is the weight of the implement, which is of particular importance in an implement adapted to be carried on a tractor in transport.

The present invention is designed to overcome the foregoing disadvantages, and has for its object the provision of a novel, efficient two-way or reversible plow which can be manufactured at minimum cost.

Another object of the invention is the provision of a two-way plow of novel construction adapted for mounting on a tractor to be transported thereby, and characterized by efficient operation and relatively low weight.

Another object of the invention is the provision of a novel reversible plow of the moldboard type wherein right and left-hand plow units are mounted on a frame which swings laterally to opposite diagonals with respect to the direction of travel to alternately dispose the plow units in operation for right and left-hand plowing.

A further object of the invention is the provision of a novel two-way plow wherein an allochiral plowshare combining a share and shin section is disposable in position for either right or left-hand plowing and a pair of moldboard sections are alternately and automatically movable into positions with one of the moldboard sections in mating and operative relation to the combination share and shin section.

Another object of the invention is the provision of novel means for leveling a two-way plow.

Still another object of the invention is the provision, in a two-way plow, of novel locking means for holding the plow in each of its alternate operating positions.

Other objects and advantages of the invention will become clear from the following detailed description when read in conjunction with the accompanying drawings, wherein:

FIGURE 1 is a plan view of the rear end of a tractor having mounted thereon an implement embodying the features of this invention;

FIGURE 2 is a view in side elevation of the structure shown in FIGURE 1;

FIGURE 3 is a front elevation of the implement of this invention, with parts removed, disconnected from the tractor;

Figure 4:
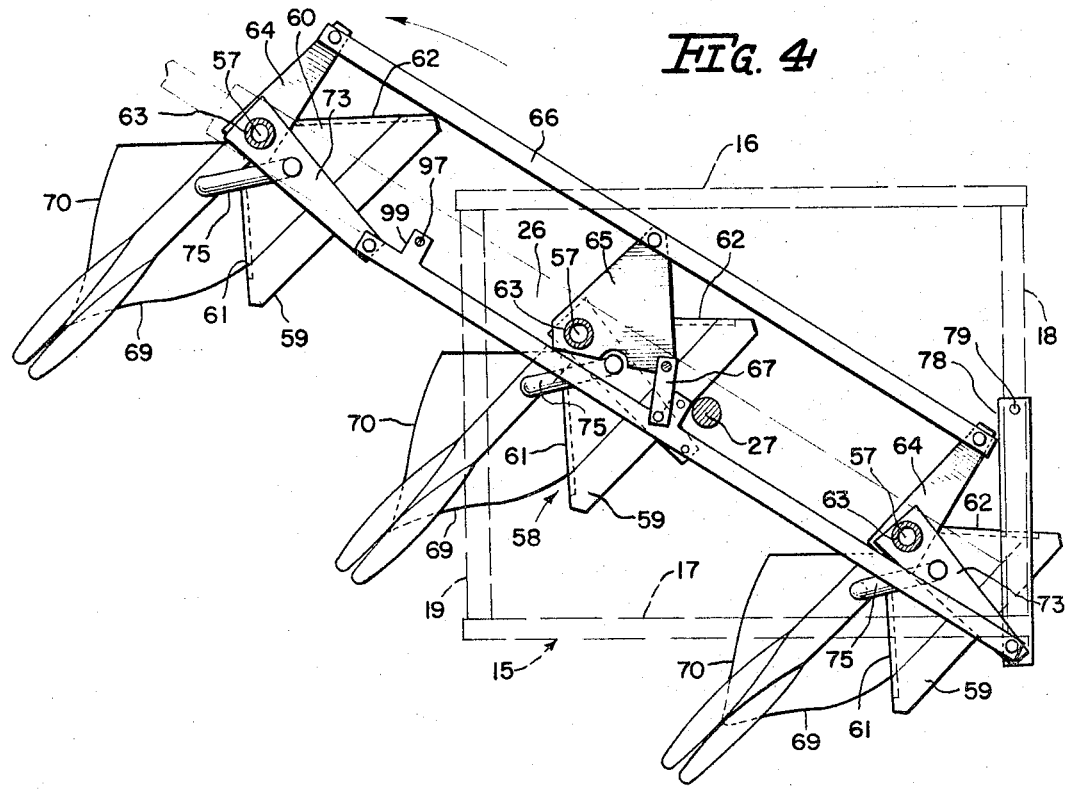
FIGURE 4 is a diagrammatic sectional plan view of a portion of the operating mechanism of the reversible moldboard plow of this invention in the right-hand position of the plow units.

In the drawings the implement of this invention is shown as connected to a tractor 10 having laterally spaced rear wheels 11 and a power lifted hitch structure 12 of the three-point type comprising a lower pair of laterally spaced links 13 pivotally connected in a well-known manner, not shown, to the tractor and raised and lowered by conventional power means, also not shown, carried by the tractor. The tractor hitch structure 12 also includes an upper forwardly and downwardly directed link 14 also pivotally connected to the tractor.

The two-way plow of this invention comprises a rectangular main frame 15 having channel-shaped side plates 16 and 17 connected at their forward ends by a crossbar 18 secured to the base of the plates and rear cross bar 19 affixed to the top of channels 16 and 17. Between bars 18 and 19 channel-shaped braces 20 and 21 are affixed to the bottom and top, respectively, of side plates 16 and 17.

Laterally spaced pairs of angle bars 22 are affixed to and depend from forward bar 18 of the main frame and each pair of angle bars is connected by a plate 23 having an arcuately shaped diagonal slot 24 formed therein.

Main frame 15 provides support for an auxiliary or sub-frame designated 25 which comprises an elongated beam 26, rectangular in section, pivotally mounted, medially of its ends, upon a vertical pivot pin 27 carried by the channel-shaped brace members 20 and 21. In the form of the plow shown in the drawings, a beam extension 28 is provided which carries a gauge wheel 29.

Figure 5:
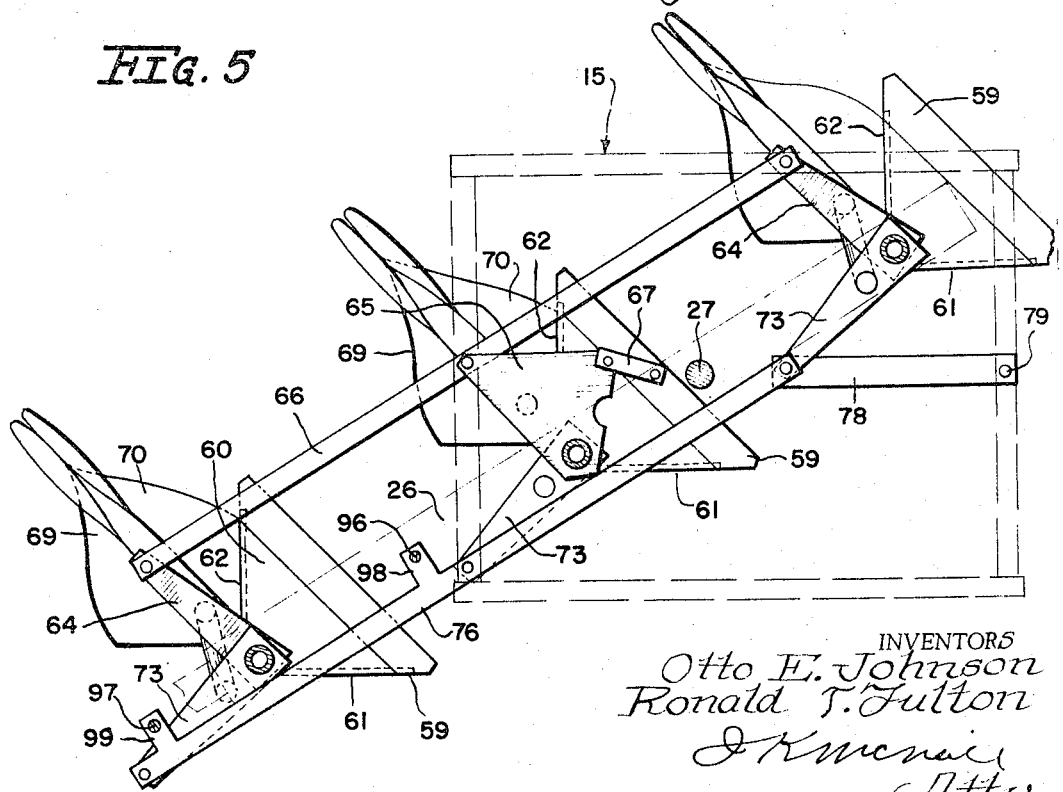
FIGURE 5 is a diagrammatic sectional plan view of the structure shown in FIGURE 4 but in the left-hand plowing position of the parts.

The pivot pin or bolt 27 is provided with a cap 30 and constitutes a vertical axis for the lateral swinging of the tool-carrying beam 26 to opposite diagonal positions relative to the direction of travel of the tractor and implement to positions corresponding to right and left-hand plowing positions as indicated in FIGURES 4 and 5. This lateral shifting or swinging of the implement from one operating position to another is guided by a combination guide and leveling apparatus comprising a transversely extending tubular member 31 having a pair of uprights 32 affixed centrally thereof and having a sleeve 33 affixed therebetween and adapted to receive a pivot bolt 34, one end of which is affixed to an arch-shaped bar 35, square in cross-section, having rearwardly diverging arms 36 and 37, the rear ends of which are secured to side plates 16 and 17.

The tubular member 31 is pivotally suspended upon the forward end of pivot bolt 34 by means of a bracket 38, the lower end of which is mounted upon a bar 39 affixed to cross bar 18. Thus, member 31 is capable of swinging in a vertical plane about the axis of pivot bolt 34 between plow leveling positions corresponding to right and left-hand plowing positions.

Laterally spaced legs 40 are affixed to and depend from tubular member 31 and are provided with pins 41 slidably receivable in the respective slots 24 in plates 23. Also affixed to legs 40 and projecting laterally therefrom are pegs 42 to which the rear ends of lower tractor hitch links 13 are pivotally connected. Pins 41 are confined in slots 24, the curvature of each of which is on an arc about the axis of pivot bolt 34. The spaced arms of brocket 32 carry therebetween a pivot pin 43 to which is connected the rear end of upper hitch link 14, pin 43 being received in a slot 44 as shown in FIGURE 2, for a purpose hereinafter to be set forth.

Upwardly and rearwardly extending plates 45 are affixed to the ends of transverse tubular member 31 and have secured to the ends thereof angle brackets 46, each of which is apertured to adjustably receive a threaded eyebolt 47 secured to the angle bracket by nuts 48 for vertical adjustment relative thereto. The ends of an arcuately shaped camming rod 49 are received in the eyes of bolts 47, and a clevis 50 affixed to and projecting from the forward end of beam 26 straddles rod 49. Thus, in order to maintain the implement level during operation, as indicated for right-hand plowing in FIGURE 3, with the right-hand tractor drive wheel in the furrow, the implement is carried on the tractor through the tubular member 31 with bracket 32 and lower link attaching pin 42. With the tractor leaning into the furrow, tube 31 assumes an angular position such as indicated in FIGURE 3 relative to the implement frame.

The implement is vertically moved between operating and transport positions by raising and lowering the tractor hitch structure 12, the latter being accomplished by any suitable power operated lifting apparatus, not shown, carried by the tractor. Lateral shifting of the tool-carrying auxiliary or sub-frame 25 is accomplished by the provision of a hydraulic cylinder 51 anchored to a lug 52 projecting inwardly from side rail 17 of the main frame 15 and having a piston rod 53 slidable therein pivotally connected to a lug 54 secured to the side of beam 26.

In FIGURE 1 the tool-carrying frame 25 is shown in the right-hand operating position of the implement with the piston rod 53 extended. Fluid under pressure is supplied to the cylinder 51 through hose lines 55 from any suitable source of fluid under pressure, such as may be mounted on the tractor. Upon retraction of the piston rod in the cylinder, the tool-carrying frame 25 swings laterally about the axis of pivot pin 27 to the left-hand plowing position indicated in FIGURE 5, whereupon tubular member 31 swings from the position shown in FIGURE 3 about the axis of bolt 34, guided by pins 41 in slots 24, clockwise to compensate for the left-hand tractor drive wheel leaning into the furrow. The plow frame is thus maintained level at all times. Rod 49 is pivotally secured medially of its ends to pipe 31 and constitutes a track received within the clevis 50 and serving to guide and control the swinging of the beam and the extent of leveling of the plow frame or the turning of tubular member 31 about the horizontal axis 34. Leveling adjustment is achieved by loosening nuts 48 and manipulating eyebolt 47 to exert pressure against one end of rod 49, such adjustment serving to regulate the relationship between bar 49 and tubular member 31, the oscillation of tubular member 31 being effected by the sliding of clevis 50 thereover from one end to the other. To the top of beam 26 is affixed a wear plate 56 engaging the under surface of arched brace member 35 and extending rearwardly therefrom.

It is believed that the general construction of the main and tool-carrying sub-frames and the manner in which the latter is laterally shifted alternately between right and left-hand plowing positions and the means by which the implement frame is leveled should be clearly understood. A plurality of vertical spindles 57 are rotatably mounted in beam 26 at longitudinally spaced locations, and each spindle has mounted upon its lower end an allochiral earthworking element or unit in the form of a symmetrical plow share unit 58, including an elongated share section 59 and a shin section 60. The plow share unit 58 has an elongated lower earth penetrating edge and a short upper edge parallel thereto and having its face concaved and with opposed, moldboard-mating edges 61 and 62.

Each of the spindles 57 is provided at its top with a collar 63, and below beam 26 a laterally projecting arm 64 is secured to each of the front and rear spindles 57, as by welding, and an arm 65 in the form of a generally triangular plate is affixed to the central spindle 57.

Arms 64 and 65 constitute lever arms, the outer ends of which are pivotally connected to an elongated strap or link 66, and a link 67 is pivotally anchored at one end to a plate 68 affixed to the lower channel member 20 of the main frame, the other end of link 67 being pivotally connected to the triangularly shaped arm or plate 65. Thus, upon actuation of cylinder 51 to laterally swing the tool beam 26 about its axis 27, force is transmitted through link 67 to arm 65 and link 66 to simultaneously revolve spindles 57 about their axes to swing the symmetrical plow share 58 from a right-hand plowing position such as indicated in FIGURE 4 to a left-hand plowing position as indicated in FIGURE 5. The length of arms 64 and 65 and link 67 are so chosen that sufficient rotary motion is imparted to the plow share 58 when beam 26 is swung from one operating position to another, that the forward lower edge of plowshare 59 is substantially at a 45° angle to the direction of travel of the plow. As shown in FIGURE 4, arms 64 and 65 swing in the direction of the arrow in FIGURE 4 when the plow shares 58 are swung from right-hand to left-hand plowing position.

Since in each of the operating positions thereof, plowshare 58 constitutes only an element of a complete plow bottom a pair of right-hand and left-hand moldboard elements 69 and 70 are provided, right-hand moldboard 69 being adapted to mate with the right-hand moldboard edge 61 of the plow share in the right-hand plowing position of FIGURE 4, and left-hand moldboard 70 being adapted to alternately mate with the left-hand moldboard edge 62 of the plowshare when the implement is reversed to the left-hand plowing position of FIGURE 5.

In each operating position of the tool-carrying beam 26 one of the moldboards 69 and 70 is substantially in engagement with the adjacent edge of the plowshare and has a curvature which forms a continuation of the curvature of the plowshare 58 to form a complete plow bottom.

Each pair of right and left-hand moldboards 69 and 70 is mounted on an upright member 71 parallel to spindle 57 and having secured to its lower end a foot 72 pivoted on the lower end of spindle 57 to accommodate lateral swinging of upright 71 and the moldboards 69 and 70 mounted thereon from a right-hand plowing position with the right-hand moldboard 69 in mating relation to the edge 61 of the symmetrical share 58, to the left-hand plowing position as indicated in FIGURE 5 with the left-hand moldboard 70 in mating relation to the moldboard edge 62 of the plowshare. In swinging from the right-hand plowing position of FIGURE 4 to the left-hand plowing position of FIGURE 5 arms 64 and 65 move counterclockwise with respect to the axis of spindle 57 as indicated by the arrow in FIGURE 4. The plowshare 58 likewise swings in a counterclockwise direction while the moldboards 69 and 70 swing as a unit in the opposite direction, or clockwise. This is accomplished by the provision of a lever 73 secured to a sleeve 74 pivotally mounted on spindle 57. The upper end of each upright 71 is bent laterally and upwardly to form an arm 75 affixed, as by welding, to the lever 73.

A lever 73 is mounted on each of the spindles 57 and these levers are pivotally interconnected by a strap or link 76, the forward end of which, in addition to its connection to the forward lever 73, is also connected by pivot bolt 77 with one end of a link 78, the other end of which is pivotally connected by a pin 79 with the front main frame bar 18. Thus, for example, when the tool carrier 26 is swung in a clockwise direction about its pivot 27 from the left-hand plowing position of FIGURE 5 to the right-hand plowing position of FIGURE 4, levers 73 move counterclockwise to swing arms 75 and moldboards 69 and 70 as a unit until moldboard 69 is in mating relation to the moldboard edge 61 of the plowshare.

A common landside 80 is provided for each of the alternate plowing positions of the implement, the rearmost landside being provided with an extension 81. Each of the landsides is pivotally mounted upon the lower end of spindle 57 and is provided with a forward extension 82 engageable with a frog plate 83 forming a landside for and secured to the plowshare adjacent each of the moldboard-engaging edges thereof, each of the plates 83 serving as a stop to limit the lateral movement of the landside 80 about the axis of spindle 57.

In operation, upon reaching the end of a field, the operator actuates the power lifted hitch structure 12 to lift the implement from the ground before turning to reverse the direction of plowing, and operates cylinder 51 to swing tool carrier 25 laterally to its alternate operating position. The plow is locked in operating position by left and right-hand latches 84, shown in FIGURE 1, each of which comprises a spring bar 85 parallel, respectively, to portions 36 and 37 of arch bar 35 and secured at their outer ends to the side bars 16 and 17 of the main frame 15. The inner ends of bars 85 are connected by upwardly extending pins 86 with the rear ends of arms 87 affixed to a shaft 88 rockably mounted in lugs 89 affixed to arch bar 35.

To the underside of each of the bars 85 is secured a stop block 90, indicated in FIGURE 1 as engaging the side of plate 56 which is secured to the forward end of beam 26. Lifting the inner end of latch bar 85 releases the latch by moving block 90 out of engagement with plate 56. This is accomplished simultaneously with lifting the implement by the provision of a post 91 affixed to shaft 88 centrally thereof and adjustably connected by a threaded rod 92 with a clevis 93 received between the uprights 32 and pivotally mounted upon the pin 43 to which the rear end of upper hitch link 14 is connected. In the right-hand plowing position of the implement shown in FIGURES 1 and 2, right-hand latch 84 is in operative engagement with the front end of the subframe 25. In order to prevent displacement of levers 73 and misalignment of moldboards 69 with the plowshare when the tool carrier 25 is swung from one alternate operating position to the other, additional latching means is provided in the form of a vertically extending pin 95 reciprocable in beam 26 having its lower end receivable in openings 96 and 97 provided, respectively, in lugs 98 and 99 projecting laterally at spaced locations from strap 76. An enlargement 100 on pin 95 received in an enlarged opening provided in the bottom of beam 26 engages the lower end of a spring 101, the other end of which engages the top of beam 26 to urge the pin into locking position. In the right-hand plowing position pin 95 has been received in opening 97 in the rearmost lug 99. Upon raising the implement to its transport position, the lost-motion provided by slot 44 allows pin 43 to move to the forward end of the slot and relative motion to occur between the hitch links 12 and the implement. Movement of pin 43 to the forward end of slot 44 rocks post 91 clockwise to place under tension a cable 102 slidable in a sleeve 103 mounted on a bracket 104 affixed to channel member 21 and extending rearwardly over a pulley 105 carried by a bracket 106 secured to beam 26, the rear end of the cable being connected to pin 95 to withdraw the pin from locking position with respect to the appropriate lug 98 or 99.

It has been pointed out that in the right-hand plowing position pin 95 is received in opening 97 in rearmost lug 99. Upon swinging the tool carrier from the right-hand plowing position of FIGURE 4 to the left-hand plowing position of FIGURE 5, opening 96 in lug 98 comes into registry with pin 95 and receives it when the implement is lowered and cable 100 relaxed.

It is believed that the construction and operation of the novel two-way plow of this invention will be clearly understood from the foregoing description. It should likewise be understood that the invention has been described in its preferred embodiment only, and that modifications may be made in the invention without departing from the spirit thereof or the scope of the appended claims.

What is claimed is:

1. The combination with a tractor having power lifted hitch means thereon, of a reversible plow having a main frame connected to the tractor and vertically movable between operating and transport positions, a generally horizontal sub-frame carrying right and left-hand plow units mounted on the main frame for lateral swinging to alternate right and left-hand plowing positions, each of said plow units comprising an allochiral plow element mounted on the sub-frame for lateral swinging therewith to positions for right and left-hand plowing, a pair of right and left-hand mating plow elements mounted on the sub-frame, and means connected between the main frame and said mating plow elements for shifting the latter relative to said first plow element to alternately dispose said mating plow elements in right and left-hand plowing positions with respect to said first plow element.

2. The invention set forth in claim 1, wherein said allochiral plow element is mounted on the sub-frame for rotation about a generally vertical axis and additional means are connected between the main frame and said allochiral plow element for rotating the latter relative to said sub-frame.

3. The invention set forth in claim 1, wherein said allochiral plow element is a generally triangularly shaped combination share and shin having oppositely disposed right and left-hand moldboard edges and said mating plow elements are right and left-hand moldboards alternately shiftable into moldboard mating relation with the respective moldboard edges of said combination share and shin.

4. A reversible moldboard plow comprising a main frame adapted for connection to a tractor, a generally horizontal sub-frame mounted on the main frame for lateral swinging to opposite diagonal positions with respect to the direction of travel, a substantially symmetrical plowshare mounted on and depending from said sub-frame for lateral swinging therwith to dispose said plowshare alternately in positions for right and left-hand plowing, said plowshare having oppositely disposed moldboard-mating edges, right and left-hand moldboards carried by the sub-frame and laterally shiftable relative thereto, and linkage operatively connecting the main frame to said moldboards and operable in response to lateral swinging of said sub-frame to alternately shift said moldboards to positions with one of the moldboards in operative relation with one of the moldboard-mating edges of the plowshare.

5. The invention set forth in claim 4, wherein said moldboards are secured to an upright member pivotally carried by the sub-frame for lateral swinging about a generally vertical axis to alternate positions in operative engagement with the moldboard-mating edges of said plowshare.

6. The invention set forth in claim 5, wherein the plowshare is secured to a generally vertical standard and said upright member is pivotally mounted on said standard for lateral swinging about the axis thereof.

7. The invention set forth in claim 6, wherein said upright member has its lower end pivotally connected to said standard and an arm formed on the upper end of said upright member is connected to said linkage for swinging the moldboards laterally in response to the lateral swinging of the sub-frame.

8. A two-way plow comprising a main frame adapted for connection to a tractor, a generally horizontal sub-frame mounted on the main frame for lateral swinging to opposite diagonal positions with respect to the direction of travel, a standard mounted on said subframe for rotation with respect thereto, a substantially symmetrical plowshare carried by said standard for rotation therewith and for lateral swinging with said subframe to alternately dispose said plowshare in positions for right and left-hand plowing, said plowshare having oppositely disposed right and left-hand moldboard-mating edges, linkage operatively connecting the main frame to said standard for rotating the latter in response to said lateral swinging of the subframe, right and left-hand moldboards mounted on the subframe for shifting in response to said lateral shifting of the subframe to alternate operating positions in moldboard relation to said moldboard-mating edges of the plowshare, and other linkage operatively connected between said main frame and said moldboards to shift the latter in response to the lateral swinging of the subframe.

9. The invention set forth in claim 8, wherein said moldboards are mounted on said sub-frame for rotation with respect thereto about a vertical axis and said first mentioned linkage and said other linkage are connected, respectively, to said plowshare and said moldboards to rotate said plowshare and said moldboards in opposite directions about their axes upon lateral swinging of said sub-frame from one alternate operating position to the other.

10. The combination with a tractor having power lifted hitch means thereon including vertically movable laterally spaced lower hitch links and an upper hitch link, of a reversible plow having a main frame connected to said hitch links for vertical movement therewith between operating and transport positions, a generally horizontal sub-frame mounted on the main frame on a generally vertical axis for lateral swinging relative thereto, an allochiral plowshare mounted on the sub-frame for lateral swinging therewith, right and left-hand moldboard means shiftably mounted on the subframe, power transmitting means mounted on the main frame connected to the sub-frame for swinging the latter about its axis, and linkage connected between the main frame and said moldboard means for shifting the latter to alternately dispose said moldboard means in moldboard relation to said plowshare for right and left-hand plowing in response to said lateral swinging of the sub-frame.

11. The combination with a tractor having power lifted hitch means thereon including vertically movable laterally spaced lower hitch links and an upper hitch link, of a reversible plow having a main frame connected to said hitch links for vertical movement therewith between operating and transport positions, a generally horizontal sub-frame mounted on the main frame on a generally vertical axis for lateral swinging relative thereto, an allochiral plowshare mounted on the sub-frame for lateral swinging therewith, right and left-hand moldboard means shiftably mounted on the sub-frame, power transmitting means mounted on the main frame connected to the sub-frame for swinging the latter about its axis, linkage connected between the main frame and said moldboard means for shifting the latter to alternately dispose said moldboard means in moldboard relation to said plowshare for right and left-hand plowing in response to said lateral swinging of the sub-frame, first latch means carried by the main frame operatively connected to said sub-frame for locking the latter in its alternate operating positions, and means operatively connecting said upper hitch link to said latch means for releasing the latch in response to lifting the plow.

12. The combination with a tractor having power lifted hitch means thereon including vertically movable laterally spaced lower hitch links and an upper hitch link, of a reversible plow having a main frame connected to said hitch links for vertical movement therewith between operating and transport positions, a generally horizontal sub-frame mounted on the main frame on a generally vertical axis for lateral swinging relative thereto, an allochiral plowshare mounted on the sub-frame for lateral swinging therewith, right and left-hand moldboard means shiftably mounted on the sub-frame, power transmitting means mounted on the main frame connected to the sub-frame for swinging the latter about its axis, linkage connected between the main frame and said moldboard means for shifting the latter to alternately dispose said moldboard means in moldboard relation to said plowshare for right and left-hand plowing in response to said lateral swinging of the sub-frame, first latch means carried by the main frame operatively connected to said sub-frame for locking the latter in alternate operating positions, means operatively connecting said upper hitch link to said latch means for releasing the latch in response to lifting the plow, and second latch means carried by the sub-frame and operatively engageable with said linkage for locking said moldboard means in either of its operating positions, said second latch means being operatively connected to said upper hitch links for simultaneous release with said first latch means upon lifting the plow.

13. The invention set forth in claim 12, wherein the connection of said upper hitch link to said main frame includes lost-motion accommodating relative movement between the main frame and said upper link.

14. A two-way plow comprising a main frame adapted for connection to a tractor, a generally horizontal sub-frame mounted on the main frame, means carried by the main frame operatively connected to said sub-frame for swinging the sub-frame laterally to opposite diagonal positions with respect to the direction of travel, a plowshare having right and left-hand moldboard mating edges mounted on and depending from said sub-frame and laterally swingable therewith to alternately dispose said plowshare in positions for right and left-hand plowing, means serving as right and left-hand moldboards mounted on the sub-frame, and means carried by the sub-frame responsive to the lateral swinging of said sub-frame and operatively connected to said means serving as moldboards to shift the latter alternately to mating positions with the respective right and left-hand moldboard mating edges of said plowshare, said means for shifting said moldboard means including linkage connected to said moldboard means and to said main frame and arranged to transmit the lateral swinging movement of the sub-frame to said moldboard means to shift the latter.

15. The combination with a tractor having power lifted hitch means thereon, of a reversible plow having a main frame connected to said hitch means for vertical movement between operating and transport positions, a generally horizontal sub-frame mounted on the main frame for lateral swinging to opposite diagonal positions with respect to the direction of travel, plow units carried by the sub-frame and swingable therewith to alternate right and left-hand plowing positions, latch means operatively connected between said main frame and said sub-frame to lock the latter against lateral swinging relative to the main frame in either operating position of the plow, comprising a spring bar secured at one end to the main frame at each side thereof and projecting inwardly therefrom, each of said bars having an abutment thereon operatively engageable with said sub-frame to lock it in its operating position, said tractor hitch means including laterally spaced lower links and an upper link pivotally attached to said main frame and operatively connected to said latch means, the connection of the upper link to the latch means including link means connected to the inner ends of said spring bars to flex the latter vertically and release said abutment from engagement with the sub-frame.

16. A two-way plow comprising a main frame adapted for connection to a tractor, a generally horizontal sub-frame carrying right and left-hand plow units mounted on the main frame for internal swinging to alternate right and left-hand plowing positions, each of said plow units comprising an allochiral plow element mounted on the sub-frame for lateral swinging therewith to positions for right and left-hand plowing, a pair of right and left-hand mating plow elements mounted on the sub-frame, and means connected between the main frame and said mating plow elements for shifting the latter relative to said first plow element to alternately dispose said mating plow elements in right and left-hand plowing positions with respect to said first plow element.

References Cited by the Examiner

UNITED STATES PATENTS

| | | | |
|---|---|---|---|
| 573,824 | 12/1896 | Lotze | 172—219 |
| 785,474 | 3/1905 | Burkhart | 172—219 |
| 1,010,117 | 11/1911 | Cizek | 172—219 |
| 2,723,612 | 11/1955 | Morkozki | 172—222 |
| 3,039,538 | 6/1962 | Coviello | 172—212 X |
| 3,115,191 | 12/1963 | Ward | 172—219 X |
| 3,212,587 | 10/1965 | Thompson | 172—222 |

FOREIGN PATENTS

| | | |
|---|---|---|
| 178,786 | 4/1922 | Great Britain. |
| 512,617 | 2/1955 | Italy. |

ABRAHAM G. STONE, *Primary Examiner.*

R. L. HOLLISTER, *Assistant Examiner.*